Dec. 13, 1938.  W. T. ROSSELL  2,139,852

COMBINED SEAT FRAME AND STANCHION

Filed Sept. 21, 1936   2 Sheets-Sheet 1

INVENTOR.
WILLIAM T. ROSSELL
BY
J. Windsor Davis
ATTORNEY.

Dec. 13, 1938.　　　　W. T. ROSSELL　　　　2,139,852
COMBINED SEAT FRAME AND STANCHION
Filed Sept. 21, 1936　　　2 Sheets-Sheet 2

INVENTOR
WILLIAM T. ROSSELL
BY
ATTORNEY

Patented Dec. 13, 1938

2,139,852

UNITED STATES PATENT OFFICE 2,139,852

COMBINED SEAT FRAME AND STANCHION

William T. Rossell, Brooklyn, N. Y., assignor to Transit Research Corporation, New York, N. Y., a corporation of New York Application September 21, 1936, Serial No. 101,760

12 Claims. (Cl. 155—1)

This invention relates to seats and stanchions and to a combination seat and stanchion construction for use in buses, rail cars and other vehicles, the stanchions being provided to assist standing passengers in retaining their balance during acceleration, deceleration and in rounding curves by the car. One of the principal objects of this invention is to provide a seat frame and a stanchion combined so that they will be as little as possible in the way of both the seated and standing passengers.

Another object is to provide a stanchion having a base anchorage above the floor of the car in the interests of sanitation, the usual stanchion base constituting a region for the collection of dirt.

Another object of this invention is to provide a combined seat frame and stanchion whose supports on the aisle end of the seat are set in from the end of the seat frame so as to be out of the way of the toes of a person standing in the aisle with their feet projecting under the seat.

Another object of this invention is to provide a stanchion so shaped and so placed in relation to a seat frame as to leave ample clearance at the end of the seat for the hip, elbow, and shoulder of a person sitting on the inner half of the seat and at the same time to provide a hand grip located practically above the edge of the seat at a convenient height for the average standing passenger.

Another object of this invention is to provide a combined seat frame and stanchion in which the stanchion is so located with respect to the seat as to be out of the way of passengers entering or leaving either that seat or the one behind it.

Figure 4:
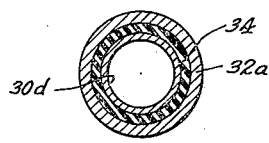
Figure 5:
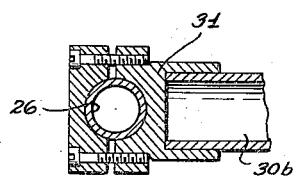
Figure 1:
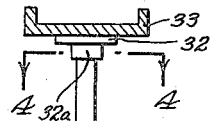
Figure 1:
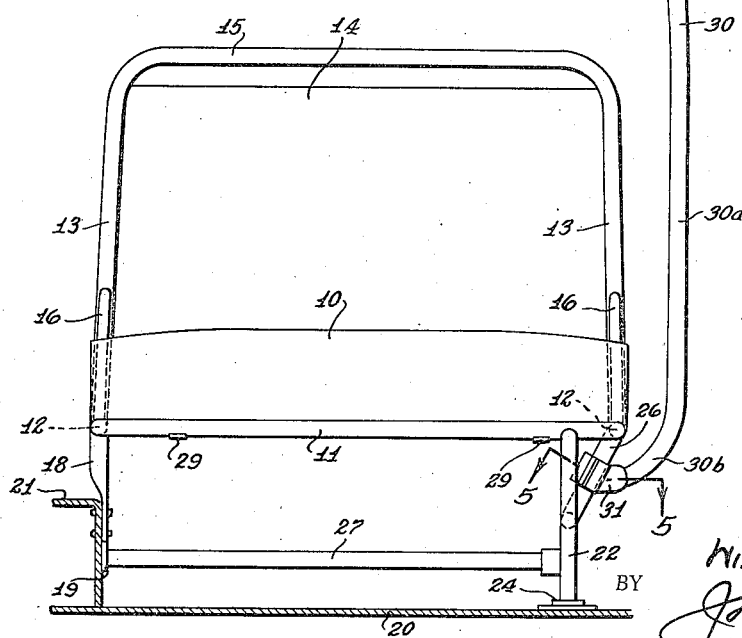
Figure 2:
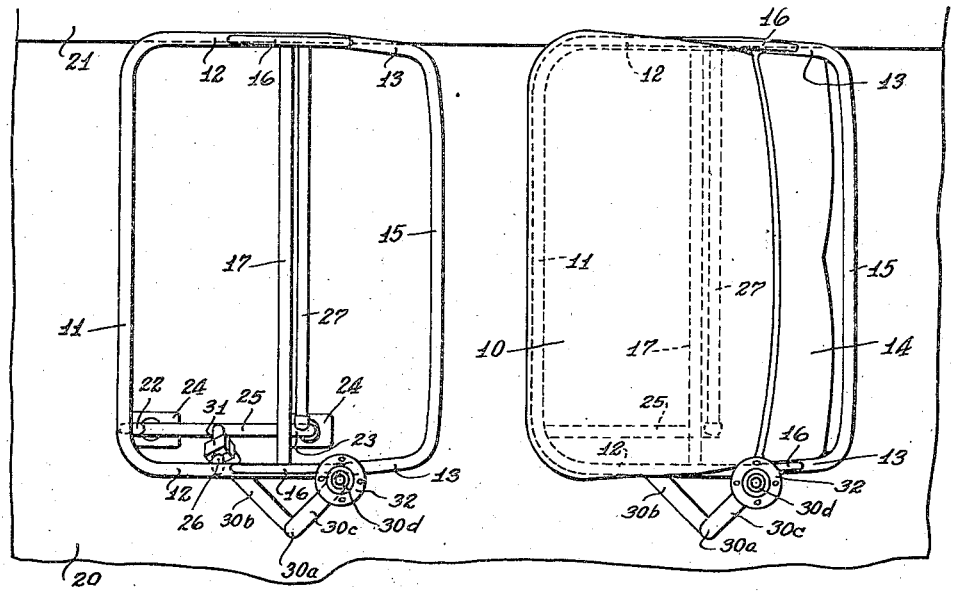
Figure 3:
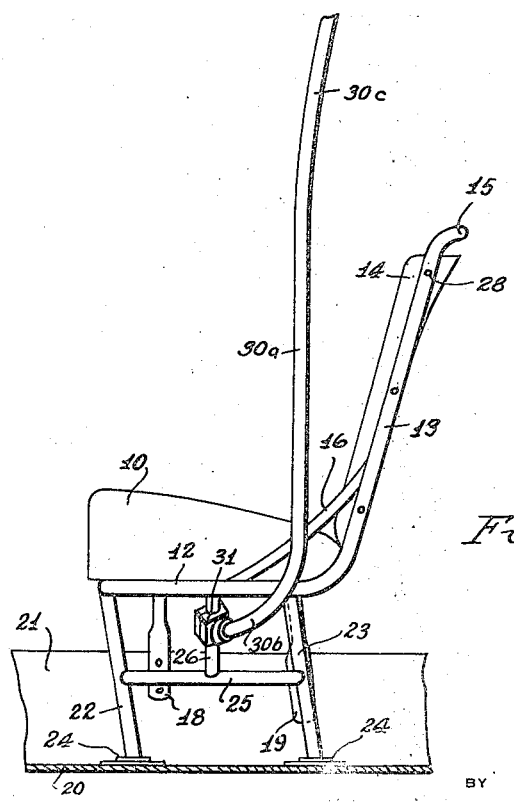

In the drawings, which illustrate one of the preferred embodiments of the invention, Figure 1 is a front elevation of my improved seat and stanchion combination, Figure 2 is a plan view showing two seats and stanchions in their proper relative positions, one seat being shown complete with its cushions and the other without cushions to more clearly show the structure of the frame, Figure 3 is an elevation of the seat end and attached stanchion, Figure 4 is a sectional view on the line 4—4 of Figure 1, taken in the direction of the arrows, and Figure 5 is a sectional view on the line 5—5 of Figure 1, taken in the direction of the arrows.

The seat frame of the embodiment of the invention shown in the drawings is composed almost entirely of pieces of steel tubing bent to shape and welded together. The greater part of the seat and back of the frame is formed by a single piece of tubing which forms a complete figure. This tubing extends longitudinally under the front of the seat cushion 10, forming the front rail 11 of the seat, then rearwardly at 12 and then upwardly at 13 at each side to form L shaped strainers, and across above the back cushion 14 to form the hand or top rail 15 at the back. Each of the strainers 12—13 is reenforced at the bend between its two legs by a small curved tubular brace 16 welded into place. The seat portion of the frame is completed by a horizontal tube 17 extending between and welded to the horizontal legs 12 of the strainers near the back and forming the back rail of the seat.

The end of the seat next to the wall of the car is supported by two short legs 18 and 19, the upper ends of which are welded to the underside of the horizontal leg 12 of the strainer portion of the frame. These legs 18 and 19 do not reach the floor 20, but their lower ends are flattened and bolted or welded to the side of an air duct 21 forming a part of the car.

The end of the seat frame next to the aisle of the car is supported by two legs 22 and 23 extending down to foot plates 24 on the floor 20. The front leg 22 is welded to the bottom of the front rail 11 of the seat and the back leg 23 is welded to the bottom of the back rail 17 of the seat. The two legs 22 and 23 are joined by a stretcher 25 to the center of which is welded the lower end of a short seat brace 26, the upper end of the brace being welded to the horizontal leg 12 of the adjacent strainer.

The two back legs 19 and 23 support a horizontal tube 27 extending from one leg to the other a few inches above the floor 20 and forming a footrest for passengers in the seat behind.

The cushion 14 for the back of the seat fits between the upright legs 13 of the strainers and is secured to them by screws 28 extending through them into the frame of the cushion 14. The front of the seat cushion 10 rests on front rail 11 and on the forward parts of the horizontal legs 12 of the strainers. The back of the seat cushion 10 is slightly narrower than the front so as to fit between the back braces 16 and rests upon the rear seat rail 17 extending between the horizontal legs 12 of the two strainers near the back. The back braces 16 at the sides of the seat cushion 10 hold it against sideward movement, and clips 29 screwed to the bottom of the seat cushion 10 and extending under the seat rails 11 and 17 hold the cushion down and keep it from sliding ahead or back.

The stanchion 30 comprises a single piece of tubing extending from the seat frame to the ceiling of the car and curved in two planes so that its various portions are situated in the most convenient positions. The lower part 30a of the tube extends vertically several inches away from the side of the seat and approximately opposite the hips of a person on the seat. The lower end 30b of the tube curves forwardly and inwardly and is secured to the seat brace 26 by a combination socket and clamp 31 which fits the end of the tube and encircles the seat brace 26.

The middle section 30c of the stanchion 30, extending from the level of the top of the seat back 14 to the level of the head of a standing passenger, is bent in the form of a gentle ogee curve lying in a vertical plane extending back and towards the seat from the axis of the lower part 30a of the stanchion. Thus the straight vertical upper part 30d of the stanchion lies approximately above the rear corner of the seat cushion 10.

The upper end of the stanchion is secured in a socket 32a on a ceiling plate 32 fastened to a structural member 33 in the roof of the car. The socket 32a is lined with a rubber sleeve 34 which makes a tight fit between the stanchion 30 and the socket 32a irrespective of whether the axes of the two are exactly aligned.

It will be seen from the above description that I have provided a combined seat frame and stanchion so arranged as to be most convenient. The space just above the floor under the end of the seat is clear for the feet of standing passengers and is easy to clean. The part of the stanchion level with the hips, elbows and shoulders of the seated passenger is spaced out to the side to provide a little extra room for the seated passenger and the upper part is set in and is at the most convenient position for a standing passenger.

While only one specific embodiment of the invention has been described above, my invention is not limited thereto, as will be seen by the scope of the accompanying claims, in which the terms used are to be broadly interpreted. For example, the term "cushion" is not limited to soft members containing springs or padding but refers broadly to the parts of a seat upon which one sits or leans, whether it be a cushion in the strict sense of the word or not.

What I claim is:

1. A combined seat and stanchion comprising seat and back cushions, means for supporting said cushions in seat-forming relation above the floor of a vehicle, and a stanchion having its lower end spaced from the floor and secured to said means, said stanchion extending up beside an end of said cushions, the portion of the stanchion horizontally opposite said cushions being laterally spaced therefrom, and the lower end of said stanchion being bent substantially horizontally at its point of attachment.

2. A combined seat and stanchion comprising seat and back cushions, means for supporting said cushions in seat-forming relation above the floor of a vehicle, and a stanchion having its lower end spaced from the floor and secured to said means, said stanchion extending up beside an end of said cushions, the portion of the stanchion opposite said cushions being laterally spaced therefrom, and the portion of the stanchion higher than the cushions curving in towards them.

3. A combined seat and stanchion comprising seat and back cushions, means for supporting said cushions in seat-forming relation above the floor of a vehicle, and a stanchion having its lower end spaced from the floor and secured to said means, said stanchion extending up beside an end of said cushions, the portion of the stanchion opposite said cushions being laterally spaced therefrom, the portion of the stanchions just higher than the cushions curving in towards them, and the upper portion of the stanchion being approximately above the adjacent rear corner of the seat cushion.

4. A combined seat and stanchion comprising seat and back cushions, means for supporting said cushions in seat-forming relation above the floor of a vehicle, and a stanchion having its lower end spaced from the floor and secured to said means, said stanchion extending up beside an end of said cushions, the portion of the stanchion opposite said cushions being laterally spaced therefrom and the portion of the stanchion higher than the cushions curving back and in towards the cushions.

5. A combined seat and stanchion comprising seat and back cushions, means for supporting said cushions in seat-forming relation above the floor of a vehicle, and a stanchion having its lower end spaced from the floor and secured to said means, said stanchion extending up beside an end of said cushions, the portion of the stanchion opposite said cushions rising vertically a little ahead of the back of the seat cushion and laterally spaced therefrom, the portion of the stanchion just higher than the cushions curving back and in towards the cushions and the upper portion of the stanchion being vertical and approximately above the adjacent rear corner of the seat cushion.

6. A combination seat frame and stanchion comprising a seat frame portion adapted to support a seat cushion, a pair of legs depending from said seat frame portion and supporting one end thereof, a stretcher extending between said legs below said seat frame portion, a stanchion extending up beside said seat, and means secured to said stretcher for supporting the lower end of said stanchion.

7. A combination seat frame and stanchion as described in claim 6 in which said legs are set in from the end of said seat frame portion.

8. A combination seat frame and stanchion as described in claim 6 in which the upper end of said stanchion is provided with means for attachment to the ceiling of a car.

9. A combination seat frame and stanchion comprising a seat frame portion adapted to support a seat cushion, a pair of legs depending from said portion and supporting one end thereof, a stretcher extending between said legs, a brace extending from said stretcher to said seat frame portion, and a stanchion extending up beside said seat and having its lower end secured to said brace.

10. A combination seat frame and stanchion as described in claim 9 in which said legs are set in from the end of said seat frame portion.

11. A combination seat frame and stanchion as described in claim 9 in which the upper end of said stanchion is provided with means comprising an elastic socket for attachment to the ceiling of a car.

12. A combination seat frame and stanchion comprising a seat frame portion adapted to support seat and back cushions, a pair of legs depending from said portion, said legs being set in from one end and adapted to support said portion, a stretcher extending between said legs, a brace extending from said stretcher to the end of said seat frame portion, and a stanchion opposite said cushions being spaced laterally therefrom and rising vertically a little ahead of the back of said seat cushion and the portion of the stanchion higher than said cushions curving back and in towards said cushions and rising vertically approximately above the adjacent rear corner of said seat cushion.

WILLIAM T. ROSSELL.